United States Patent
Clar et al.

(10) Patent No.: US 9,651,381 B2
(45) Date of Patent: May 16, 2017

(54) TERRAIN MAPPING SYSTEM USING VIRTUAL TRACKING FEATURES

(71) Applicant: Caterpillar Inc., Peoria, IL (US)

(72) Inventors: Jean-Jacques Clar, Edelstein, IL (US); Troy Kenneth Becicka, Sahuarita, AZ (US); Michael Allen Taylor, Swissvale, PA (US); Robert Jason McGee, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 583 days.

(21) Appl. No.: 14/152,447

(22) Filed: Jan. 10, 2014

(65) Prior Publication Data

US 2015/0198736 A1 Jul. 16, 2015

(51) Int. Cl.
  *G01C 21/20* (2006.01)
(52) U.S. Cl.
  CPC ..... *G01C 21/20* (2013.01); *G05D 2201/0202* (2013.01)
(58) Field of Classification Search
  CPC ........ G01V 9/00; G01V 99/00; G01V 99/005; G01C 21/20; G01C 21/26; G01C 21/28; G01C 21/30; G01C 21/32; G05D 2201/0202
  See application file for complete search history.

(56) References Cited

U.S. PATENT DOCUMENTS

| 5,375,663 A | 12/1994 | Teach |
| 5,631,658 A | 5/1997 | Gudat et al. |
| 6,847,887 B1 | 1/2005 | Casino |
| 7,113,105 B2 | 9/2006 | Sahm et al. |
| 2012/0125244 A1 | 5/2012 | Beaujot |
| 2012/0136525 A1 | 5/2012 | Everett et al. |
| 2012/0330550 A1 | 12/2012 | Jensen |

OTHER PUBLICATIONS

Deans et al., Terrain Model Registration for Single Cycle Instrument Placement, Oct. 2003, Proceedings of the 2003 IEEE/RSJ, International Conference on Intelligent Robots and Systems, Las Vegas, Nevada, pp. 323-328.*

* cited by examiner

*Primary Examiner* — Toan Le
(74) *Attorney, Agent, or Firm* — Finnegan, Henderson, Farabow, Garrett & Dunner, LLP (57) ABSTRACT

A terrain mapping system is disclosed for a machine having at least one traction device. The system may have a sensor associated with the machine and configured to generate a signal indicative of a position of the machine. The system may also have at least one controller in communication with the sensor. The at least one controller may be configured to receive the signal from the sensor, and divide an area between the at least one traction device and a work surface into a plurality of virtual tracking features based on the signal and known geometry of the machine. The at least one controller may also be configured to track movement of the plurality of virtual tracking features, and update an electronic terrain map of a worksite based on the movement of the plurality of virtual tracking features.

16 Claims, 6 Drawing Sheets

TERRAIN MAPPING SYSTEM USING VIRTUAL TRACKING FEATURES

TECHNICAL FIELD

The present disclosure relates generally to a terrain mapping system, and more particularly, to a terrain mapping system using virtual tracking features.

BACKGROUND

Terrain at a worksite commonly undergoes geographic alteration by machines through, for example, digging, grading, leveling, or otherwise preparing the terrain for various uses. In some applications, it may be useful to map the terrain during this process. For instance, it may be advantageous to map terrain for use in identifying elevation and contour information at various points within a worksite. Having an accurate and complete terrain map may assist an operator in controlling the machine or, in some applications, facilitate autonomous control of the machines in navigating through the worksite.

One system for mapping terrain is described in U.S. Patent Application Publication No. 2012/0330550 (the '550 publication) to Jensen et al. The '550 publication describes a system having a machine and a controller configured to determine a steering parameter and a speed of a component of the machine. The controller is also configured to determine a geometry and a grade of a path on terrain along which the machine travels based on the steering parameter and the speed of the component of the machine. The controller is further configured to create a map indicating the path on the terrain based on the geometry and the grade of the path.

Although the system of the '550 publication may map terrain, it may be inefficient and inaccurate. For example, the system of the '550 publication maps terrain based solely on machine parameters. This can lead to inaccurate elevation and contour information on the terrain map. In addition, the terrain map of the '550 publication may function to map only areas directly beneath the machine. As a result, an incomplete terrain map may be created.

The disclosed system is directed to overcoming one or more of the problems set forth above and/or other problems of the prior art.

SUMMARY OF THE INVENTION

In one aspect, the present disclosure is directed to a terrain mapping system for a machine having at least one traction device. The system may include a sensor associated with the machine and configured to generate a signal indicative of a position of the machine. The system may also include at least one controller in communication with the sensor. The at least one controller may be configured to receive the signal from the sensor, and divide an area between the at least one traction device and a work surface into a plurality of virtual tracking features based on the signal and known geometry of the machine. The at least one controller may also be configured to track movement of the plurality of virtual tracking features, and update an electronic terrain map of a worksite based on the movement of the plurality of virtual tracking features.

In another aspect, the present disclosure is directed to a method for mapping terrain. The method may include sensing a position of a machine as the machine travels along the terrain via at least one traction device, and dividing an area between the at least one traction device and a work surface into a plurality of virtual tracking features based on the sensed position of the machine and known geometry of the machine. The method may also include tracking movement of the plurality of virtual tracking features, and updating an electronic terrain map of the worksite based on the movement of the plurality of virtual tracking features.

DETAILED DESCRIPTION

Figure 1:
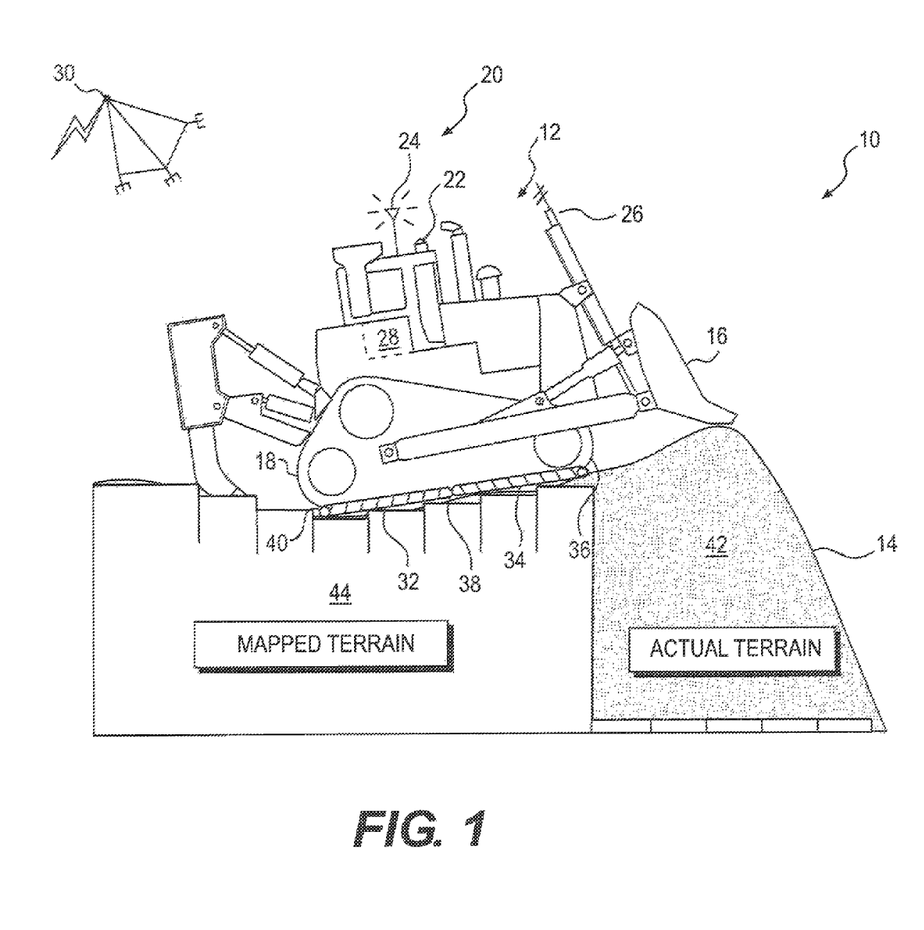
FIG. 1 is a pictorial illustration of an exemplary disclosed terrain mapping system during a first operation.

FIG. 1 illustrates a worksite 10 and an exemplary machine 12 performing a task at worksite 10. Worksite 10 may include, for example, a mine site, a landfill, a quarry, a construction site, or any other type of worksite having terrain 14 traversable by machine 12. The task being performed by machine 12 may be associated with altering the geography at worksite 10, and may include a hauling operation, a grading operation, a leveling operation, a plowing operation, a bulk material removal operation, or any other type of operation. As machine 12 operates at worksite 10, the shapes, dimensions, and general positions of terrain 14 may change.

Machine 12 may embody a mobile machine, for example a dozer, a haul truck, a motor grader, or a loader. Machine 12 may be a manned machine configured to traverse terrain 14 under the control of an operator, a self-directed machine configured to autonomously traverse terrain 14, or a hybrid machine configured to perform some functions autonomously and other functions under the control of an operator. Machine 12 may include an engine or other power source (not shown) operable to provide a power output for various operations of machine 12. The power produced by the engine may be directed to various electrical and mechanical systems of machine 12 such as, for example, a transmission (not shown) for transmitting the power to one or more traction devices 18 (e.g., tracks), to a hydraulic system (not shown) for driving one or more hydraulic components in machine 12, to an implement system (not shown) for actuating one or more work tools 16, or to any other electrical or mechanical system configured to perform an operation associated with machine 12.

In the disclosed embodiment, machine 12 has two tracks on opposite sides of machine 12. Tracks 18 may include multiple segments (e.g., shoes) that are pivotally connected to each other end-to-end. Each shoe may have four corners and be generally rectangular in shape. The shoes of tracks 18 will be described in more detail below.

Machine 12 may be equipped with a system 20 that facilitates or enhances mapping of terrain 14 of worksite 10. System 20 may include, among other things, one or more machine sensors 22, a communicating device 24, a work tool sensor 26, and an onboard controller (OC) 28 connected to sensors 22, communicating device 24, and work tool sensor 26. When intended for use with a manually operated machine 12, system 20 may also include one or more operator interface devices (not shown). The operator interface devices may include, for example, an input device such as a joystick, keyboard, steering wheel, pedal, lever, button, switch, etc. Alternatively or additionally, the operator interface devices may include a display device such as a monitor, if desired.

Sensors 22 may be configured to determine one or more parameters of machine 12 and generate corresponding signals indicative thereof. For example, sensors 22 may include a position sensor configured to determine a position of machine 12. The position sensor could embody, for example, a Global Positioning System (GPS) device, an Inertial Reference Unit (IRU), a local tracking system, or any other known position sensor that receives or determines positional information associated with machine 12. In some embodiments, the positional information may be three-dimensional, although units providing only two-dimensional information may also be used. Sensors 22 may also include an angle sensor (e.g., an accelerometer) configured to determine an acceleration of machine 12. Sensors 22 may further include a tilt sensor configured to detect a pitch and a roll of a frame of machine 12. Sensors 22 may also include a load sensor configured to detect a payload of work tool 16 (i.e., a mass of material contained within and transported by work tool 16). It is contemplated that system 20 may utilize any number of sensors 22 discussed above, as desired. Based on the signals generated by sensors 22 and based on known kinematics of machine 12, OC 28 may be able to determine in real time positions, headings, traveling speeds, accelerations, orientations, masses, and/or inertias of machine 12.

Work tool sensor 26 may embody any type of sensor configured to detect a position of work tool 16 relative to a known position on machine 12 (e.g., relative to sensors 22), and generate a corresponding signal indicative thereof. Work tool sensor 26 may also be configured to detect an operational state of work tool 16 (e.g., whether work tool 16 is engaged with a work surface). In one example, work tool sensor 26 may be an acoustic, magnetic, or optical type sensor associated with actuators and linkage that move work tool 16, for example associated with a hydraulic ram, a rotary motor, or a joint. In another example, work tool sensor 26 may be a local and/or global positioning sensor configured to communicate with offboard devices (e.g., local laser systems, radar systems, satellites, etc.) to directly determine local and/or global coordinates of work tool 16. It is contemplated that any number and type of work tool sensors 26 may be included and positioned at any location on or near work tool 16. Based on signals generated by work tool sensor 26 and based on known kinematics of work tool 16, OC 28 may be configured to determine in real time a location of the associated work tool 16 relative to the known position of machine 12.

Communicating device 24 may include hardware and/or software that enables sending and receiving of data messages between OC 28 and an offboard worksite controller (OWC) 30. The data messages may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable communications device 24 to exchange information between OWC 30 and the components of system 20.

OC 28 may embody a single or multiple microprocessors, field programmable gate arrays (FPGAs), digital signal processors (DSPs), etc., that is configured to update an electronic terrain map of worksite 10 in response to the real-time data from sensors 22 and/or work tool sensor 26. In some embodiments, OC 28 may also be configured to control operations of machine 12 in response to operator requests, built-in constraints, sensed operational parameters, and/or communicated instructions from OWC 30. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

OWC 30 may include any means for monitoring, recording, storing, indexing, processing, and/or communicating various operational aspects of worksite 10 and any number of machines 12, including, for example, the electronic terrain map of worksite 10. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

The electronic terrain map may be a compilation of data that is periodically updated by OC 28 and/or OWC 30 with changes made to worksite 10 by any of machines 12 operating at worksite 10. The changes made to worksite 10 may be determined by tracking the movement of machine 12 and/or work tool 16 during performance of a task by each individual machine 12. The electronic terrain map may store previously-gathered points in a matrix form. Each point may include a location (e.g., Cartesian, polar, or spherical coordinate data) about a particular point on a surface of worksite 10. It is to be appreciated that, as worksite 10 undergoes geographic alteration (e.g., excavation), the surface may change with time. Accordingly, the terrain map may store a matrix containing points defining the most recently scanned and stored surface of worksite 10. In one embodiment, each point may have a form of (x, y, z, t), where x, y, and z are the location of the particular point on the surface of worksite 10 with respect to a coordinate system; t is the time location of the point. Each point may be stored in the electronic terrain map based on a tracked movement of a corresponding machine 12 and/or the machine's work tool 16.

Figure 2:
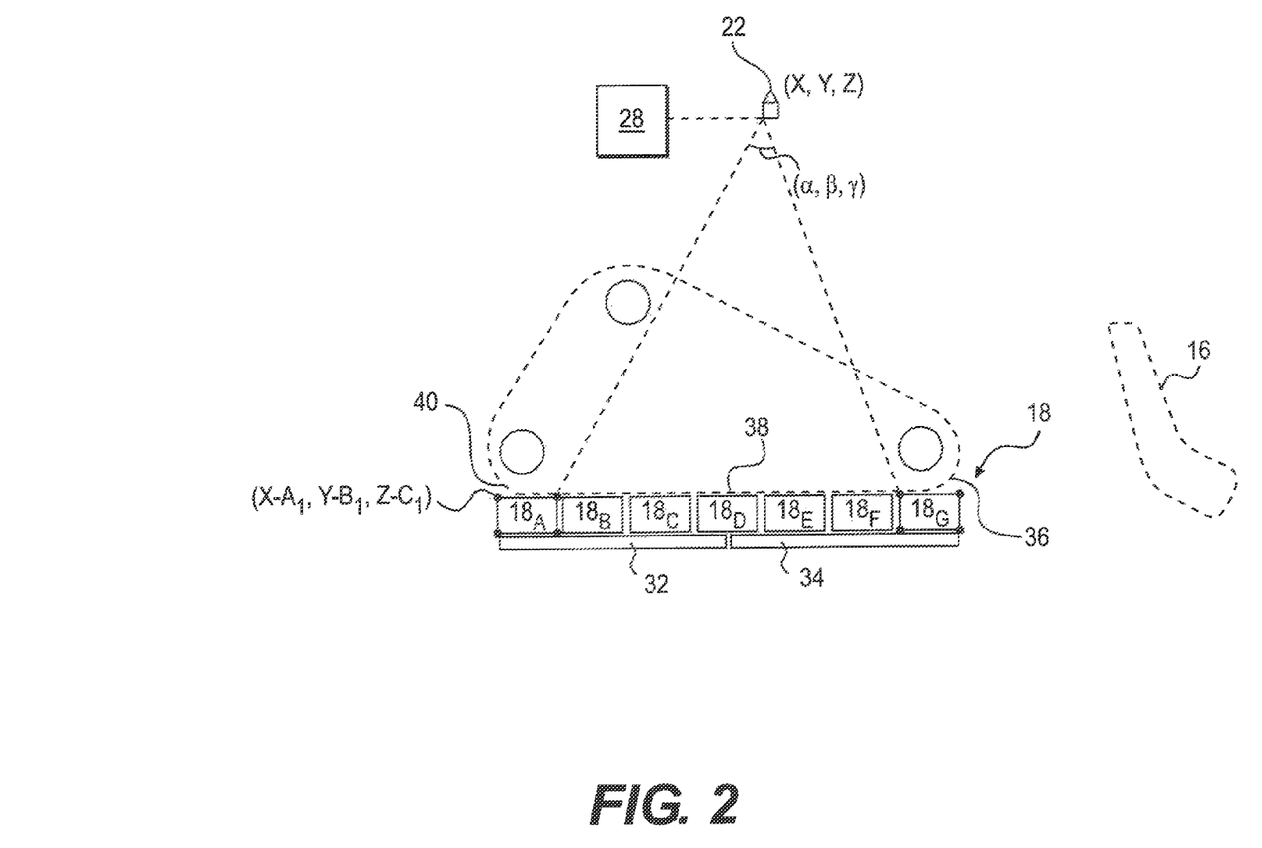
FIG. 2 is a schematic illustration of the disclosed terrain mapping system of FIG. 1 during the first operation.

As shown in FIG. 2, OC 28 may track movement of machine 12 by determining a location of tracks 18 (only one track 18 shown in FIG. 2 for clarity) relative to worksite 10. For example, OC 28 may determine a location of a bottom of tracks 18 when tracks 18 are engaged with a surface of worksite 10. To determine this location, OC 28 may first receive data from sensor 22 indicating at least a position of sensor 22. OC 28 may then obtain information or otherwise be programmed with information about dimensions of machine 12. Based on the position of sensor 22 and the dimensions of machine 12, OC 28 may determine the location of each shoe $18_{A-G}$ within tracks 18. For example, on a machine 12 having two tracks, sensor 22 may be located approximately 10 feet vertically from a lower external surface of tracks 18, about midway transversely between tracks 18, and centered lengthwise between a front roller and a rear roller of tracks 18. OC 28 may calculate corners of each rectangular shoe $18_{A-G}$ by using known offsets and angles ($\alpha$, $\beta$, $\gamma$) to each shoe $18_{A-G}$. Thus, by knowing the dimensions and configurations of each track 18, OC 28 may determine a location of a front left corner, front right corner, rear left corner, and right rear corner of each shoe $18_{A-G}$ within the track 18.

In some applications, machine 12 may be tilted at an angle when driving over uneven surfaces. To account for this, OC 28 may also receive data from the same or another sensor 22 indicating a pitch and/or roll of machine 12. OC 28 may use the pitch and roll of machine 12 to adjust the locations of the individual shoes $18_{A-G}$ (e.g., the position and orientation of each corner of each shoe $18_{A-G}$) of each track 18. Based on the locations of the corners of each shoe $18_{A-G}$, OC 28 may determine a virtual outline of tracks 18, and use all data points within that outline to update the electronic terrain map. The outline may represent a virtual tracking feature that allows OC 28 to determine locations of large areas of terrain 14 at once and compile the data to update the electronic terrain map efficiently.

In some embodiments, it may be beneficial to generate electronic tracking features separate from the shoes $18_{A-G}$ of tracks 18. For example, it may be beneficial to divide an area under each track 18 into more or less segments than there are shoes $18_{A-G}$ in track 18. As shown in FIGS. 1 and 2, OC 28 may divide the area under each track 18 into a first tracking rectangle 32 extending between a rear end 40 of tracks 18 and a middle 38 of track 18, and a second tracking rectangle 34 extending between the middle 38 of track 18 and a front end 36 of track 18. Both tracking rectangles 32, 34 may extend an entire width of each track 18. It is contemplated that a single tracking rectangle 60 could alternatively be used in place of tracking rectangles 32, 34, if desired (see FIG. 3).

Figure 3:
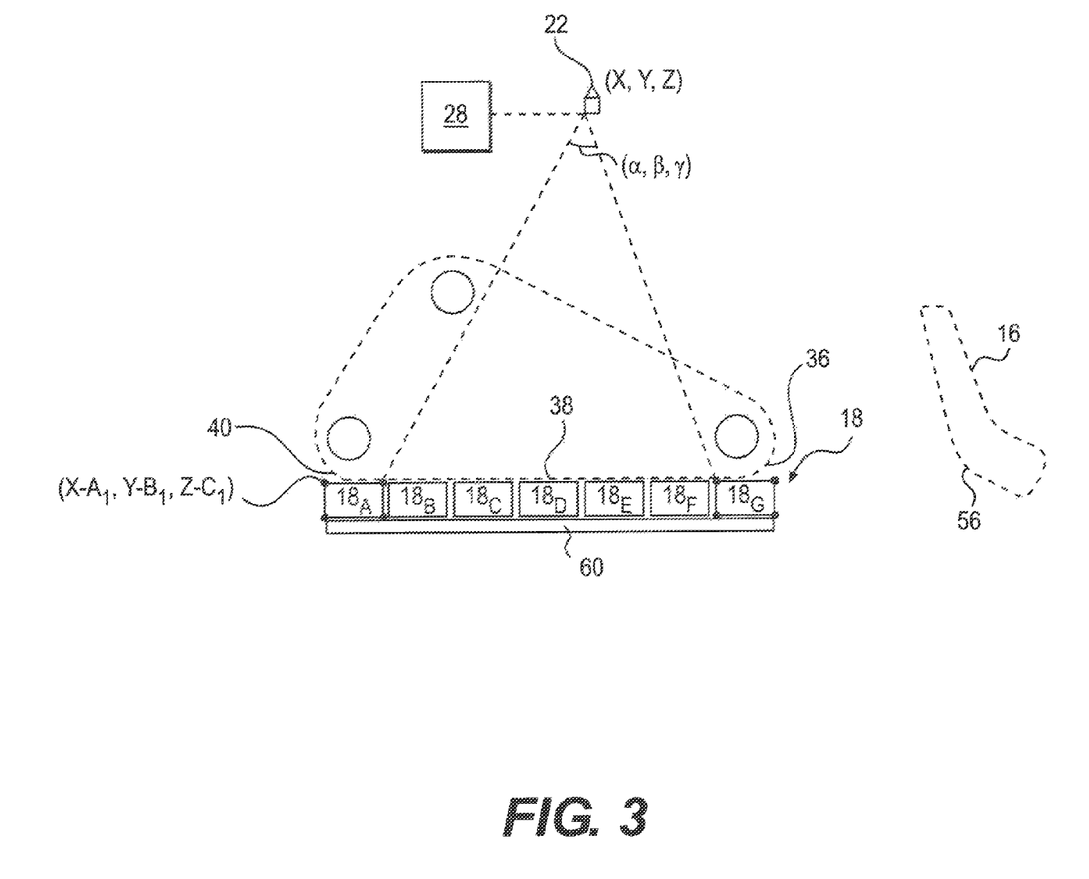
FIG. 3 is a schematic illustration of the disclosed terrain mapping system of FIG. 1 during a second operation.

In some applications, as shown in FIG. 3, the use of only a single tracking rectangle 60 for each track 18 may be desirable. For example, in situations where machine 12 is traveling at generally higher traveling speeds (e.g., speeds greater than 10 MPH), having a reduced number of tracking rectangles may allow system 20 to reduce computations, increase processing speeds, and more accurately map the terrain. In other applications, as shown in FIGS. 1 and 2, the use of multiple rectangles 32, 34 of track 18 may be desirable. For example, in situations where machine 12 is stopped or traveling at generally low traveling speeds (e.g., speeds less than 2 MPH), having an increased number of tracking rectangles may allow system 20 to increase precision of the electronic terrain map.

Data points associated with the virtual tracking features may be successively sampled over a period of time to illustrate a trajectory of tracks 18 and provide an indication of a location of the work surface that machine 12 has traveled over. Based on this trajectory and a known geometry of machine 12, OC 28 may plot elevations of terrain 14 on the electronic terrain map. The electronic terrain map may be continuously updated in real time with movements of any number of machines 12 operating at worksite 10, and communicated back to systems 20 of machines 12 at worksite 10 for subsequent use in control of the individual machines 12.

Referring back to FIG. 1, an area of terrain 14 that has not yet been mapped by the electronic terrain map is represented by an unmapped terrain region 42, while an area of terrain 14 that has already been mapped is represented by a mapped terrain region 44. OC 28 may sample data points at a predetermined distance and/or predetermined period of time, and compile the data to generate the mapped terrain region 44. Then, based on the location and time of each data point (x, y, z, t), OC 28 may update the electronic terrain map in real time. It is contemplated that, in some embodiments, tracking rectangles 32, 34 may overlap in certain regions of the electronic terrain map. In this instance, OC 28 may determine which data point has a lower elevation and use that data point to update the electronic terrain map. The data point with the lowest elevation may most accurately reflect an actual surface geometry at worksite 10. It is also contemplated that, in some applications, OC 28 may select only data points associated with a particular machine 12 and/or tracking rectangle 32, 34. For example, based on a first machine's pitch and roll, OC 28 may select one machine 12 over others, and/or select one tracking rectangle 32, 34 over the other.

By using tracking rectangles 32, 34, system 20 may accurately represent a shape of tracks 18 and, thus, a shape of the work surface below tracks 18. Also, the use of tracking rectangles 32, 34 may allow system 20 to compile multiple data points at once by determining corners of each rectangle and projecting each point within the bounds of each rectangle to correspond to a surface of each track 18 engaged with terrain 14. In the disclosed embodiment, system 20 uses a plurality of virtual tracking features to increase an accuracy of the data points of each track 18. As a result, system 20 may efficiently and accurately update the electronic terrain map to assist in control of machine 12.

With an accurate and complete electronic terrain map, an operator controlling machine 12 may be able to safely navigate worksite 10 in the event of blind spots, ditches, or any other potentially hazardous conditions on worksite 10. In addition, autonomously controlled machines 12 may benefit from an accurate and complete electronic terrain map because, in some applications, contrary to an operator controlled machine, the autonomously controlled machines 12 may depend on electronic terrain mapping to navigate through worksite 10. As a result, system 20 may facilitate operator controlled machines 12 and/or autonomously controlled machines 12 by enhancing the accuracy and completeness of the electronic terrain map.

Figure 4:
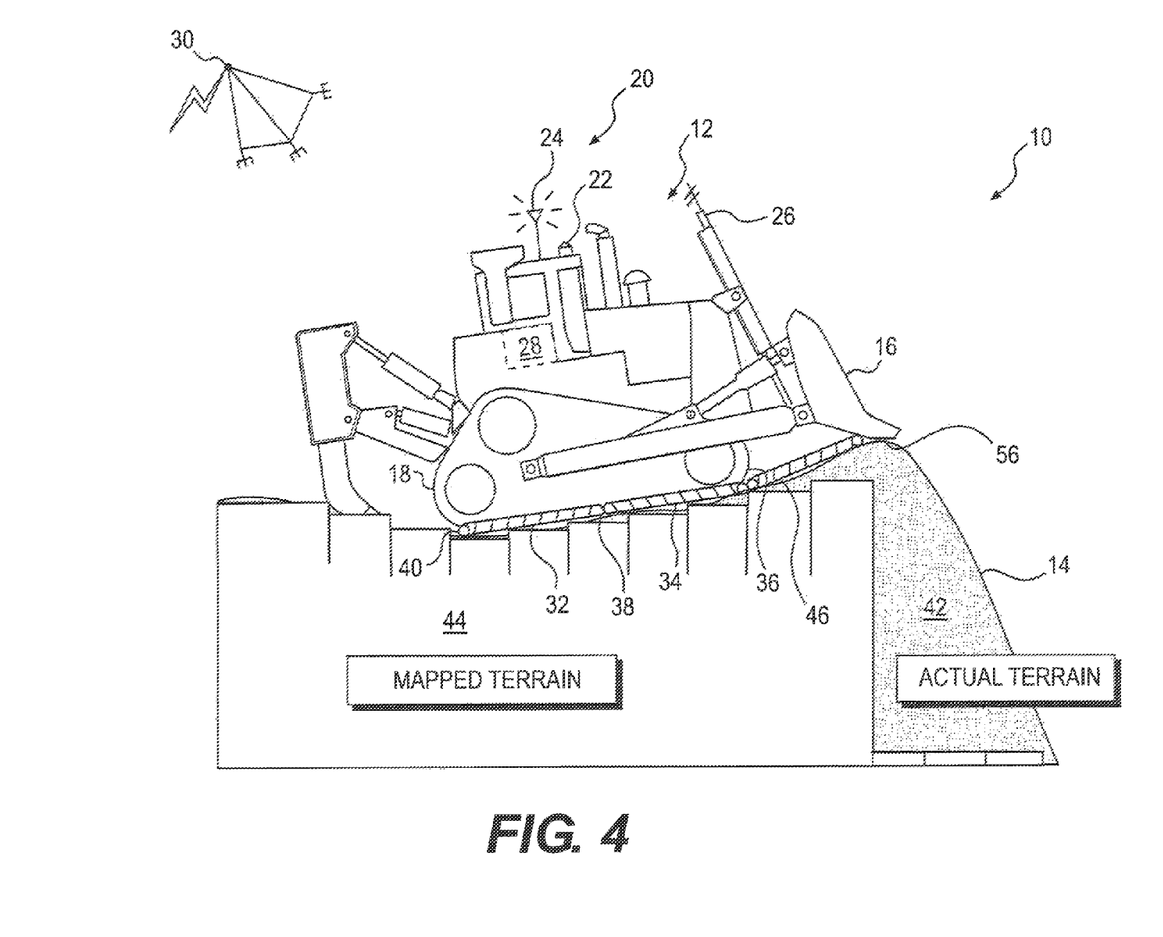
FIG. 4 is a pictorial illustration of the disclosed terrain mapping system of FIG. 1 during a third operation.

FIG. 4 illustrates another operation performed by the disclosed system 20. In this operation, OC 28 may be configured to also track movement of work tool 16 and use that movement to update the electronic terrain map. Specifically, similar to determining the location of tracks 18, OC 28 may determine a location of work tool 16 relative to worksite 10 via work tool sensor 26. As shown in FIG. 4, OC 28 may use a third tracking rectangle 46 to indicate a location extending between front end 36 of both tracks 18 and a bottom lower edge 56 of work tool 16. Tracking rectangle 46 may extend an entire width of work tool 16. Like tracking rectangles 32, 34, data points at all four corners of tracking rectangle 46 may be successively sampled to illustrate a trajectory of work tool 16 and used to provide an indication as to the geometry of the work surface between the front end of tracks 18 and the bottom edge of work tool 16.

The use of the third tracking rectangle 46 may help to expand the mapped terrain region 44. Tracking rectangle 46 may be useful in situations where a mound of material or a dip is positioned in front of machine 12. System 20 may utilize virtual tracking features associated with both tracks 18 and work tool 16, such that the tracks 18 do not need to travel over the this region to gather information about that particular work surface. In fact, in certain situations, it may be unsuitable to drive over particular areas, such as, for example, a berm at an edge of a cliff. By utilizing virtual tracking features associated with work tool 16, system 20 may increase an accuracy of the electronic terrain map and expand the bounds of the map.

In some embodiments, it may be desirable to adjust a size of at least one of tracking rectangles 32, 34, 46 based on the position, traveling speed, and/or orientation of machine 12. For instance, when machine 12 is traveling above a threshold speed (e.g., zero MPH), OC 28 may decrease the size of the tracking rectangles in order to increase accuracy of the terrain map. However, if machine 12 is traveling below the threshold speed, OC 28 may increase the size of tracking rectangles in order to map a larger area with reduced computations.

It may also be desirable to adjust a position of at least one of tracking rectangles 32, 34, 46 based on the position, traveling speed, and/or orientation of machine 12. For example, if machine 12 is traveling at a speed above a threshold speed (e.g., greater than 10 MPH), OC 28 may adjust tracking rectangle 32 and/or tracking rectangle 34 to be centered and positioned under a middle portion of tracks 18. Although less area is mapped, a smaller and centered tracking feature may provide more accurate data when traveling at higher speeds.

In other embodiments, it may be desirable to use only some of tracking rectangles 32, 34, 46 based on the position of work tool 16. For instance, if work tool 16 is raised up in the air, OC 28 may use only tracking rectangles 32, 34 to map the terrain because using tracking rectangle 46 while the work tool 16 is raised above the work surface could result in inaccurate data. However, if work tool 16 is lowered and engaged with terrain 14, OC 28 may use tracking rectangle 46 to map the terrain to expand the bounds of the terrain map. It is contemplated that, in some embodiments, OC 28 may use information about the traveling speed of machine 12 (e.g., a machine gear) together with a position of work tool 16 to determine whether to use tracking rectangle 46 to map the terrain. Additionally, OC 28 may not use tracking rectangle 46 if machine 12 is traveling in a reverse direction. Traveling in the reverse direction may indicate that work tool 16 is raised over the work surface and/or is not engaged with the work surface, and thus, data points associated with the work tool 16 while in that operational state may be inaccurate. It is contemplated that any number of additional tracking rectangles may be used. For example, if there are multiple work tools 16 on machine 12, additional tracking rectangles associated with the other work tools may be used.

In some embodiments, based on data received from work tool sensor 26 and/or machine sensors 22, OC 28 may determine whether work tool 16 is engaged with a work surface and/or how much material is in work tool 16. Based on this information, OC 28 may then determine whether to use tracking rectangle 46 in mapping the terrain. For example, if work tool 16 is at least partially full of material, OC 28 may use tracking rectangle 46 in mapping the terrain. However, if work tool 16 is substantially empty, OC 28 may not use tracking rectangle 46 in terrain mapping. This is because, when work tool 16 is empty, this often indicates that work tool 16 is raised above the work surface, and thus, data points associated with the work tool 16 while in that operational state may be inaccurate. In other embodiments, OC 28 may move work tool 16 inward toward machine 12 to gather better results for mapping. By moving work tool 16 closer to tracks 18, it may be possible to more accurately track an area in front of tracks 18, and thus, create a more accurate terrain map.

Figure 5:
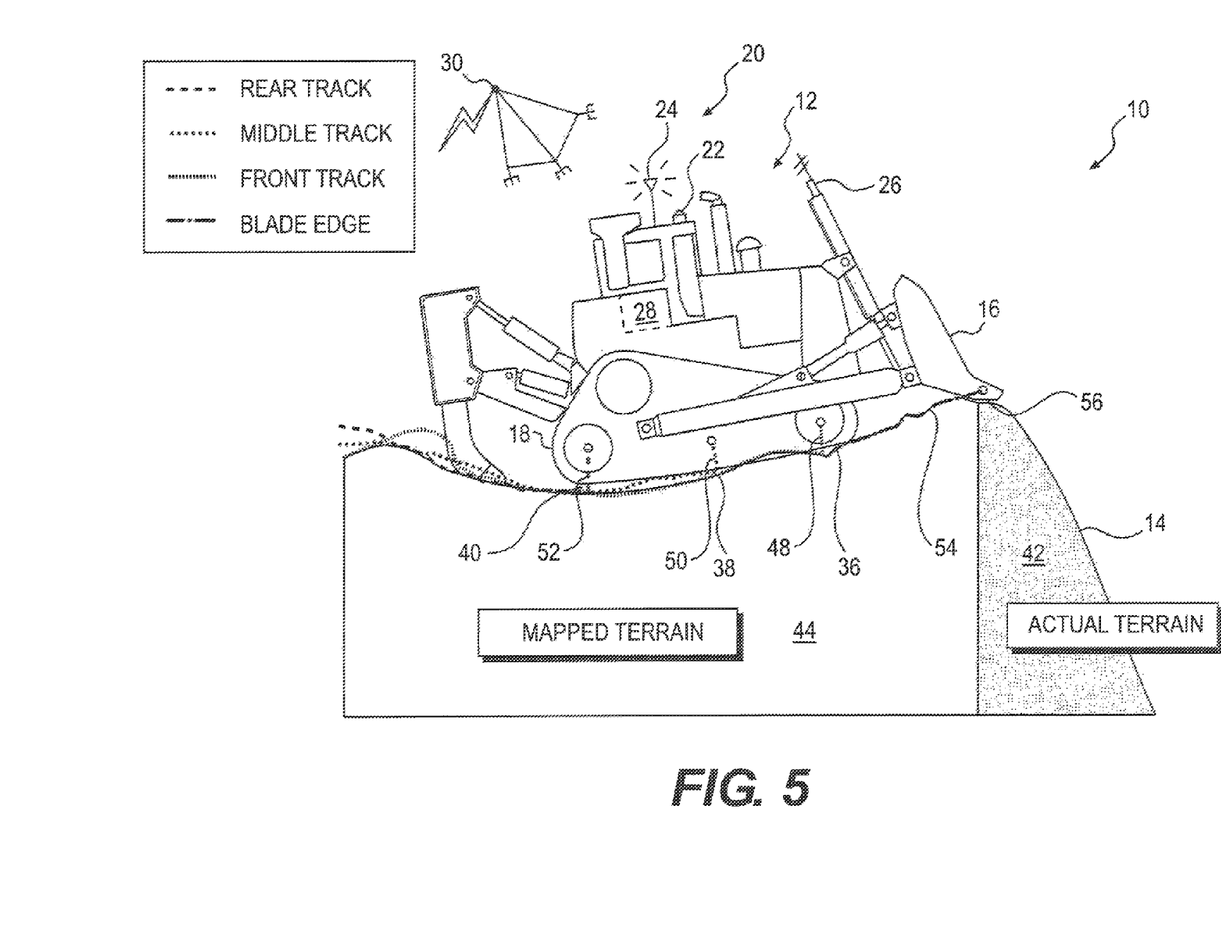
FIG. 5 is a pictorial illustration of the disclosed mapping system of FIG. 1 during a fourth operation.
Figure 6:
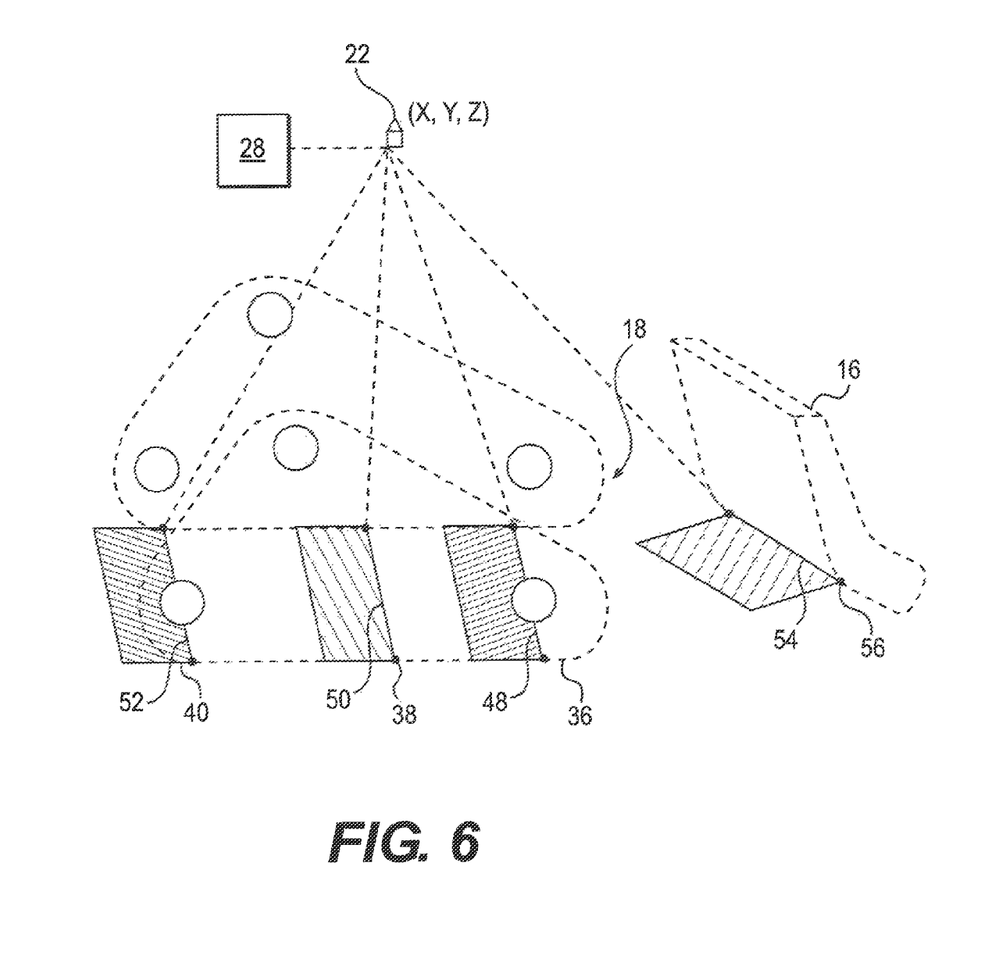
FIG. 6 is a schematic illustration of the disclosed terrain mapping system of FIG. 1 during the fourth operation.

FIGS. 5 and 6 illustrate another embodiment of the disclosed system 20. In this embodiment, instead of tracking rectangles, the plurality of virtual tracking features may include a plurality of tracking lines. For example, a front tracking line 48, a middle tracking line 50, and a rear tracking line 52 may correspond with known trajectories at front end 36, middle 38, and rear end 40 of tracks 18. As shown in FIG. 6, tracking lines 48, 50, 52 may extend between a left side end of one track 18 to a right side end of another track 18 (e.g., an entire width of both tracks 18 and a length between the tracks). Also, a blade tracking line 54 may indicate a location along the bottom lower edge 56 of work tool 16.

In one embodiment, front tracking line 48 is indicative of a point offset below a front roller of tracks 18, middle tracking line 50 is indicative a point offset below a lengthwise center of tracks 18, and rear tracking line 52 is indicative of a point offset below a rear roller of tracks 18. Tracking lines 48, 50, 52, 56 may be generated in a similar manner as the tracking rectangles. For example, based on positions of sensors 22 and/or work tool sensor 26 and known dimensions of machine 12 and/or work tool 16, OC 28 may determine corresponding locations below tracks 18 and/or work tool 16. Like with the tracking rectangles, data points may be successively sampled to illustrate a trajectory of tracks 18 and/or work tool 16 and provide an indication as to the location of the work surface as machine 12 travels over it.

In some embodiments, the gravitationally lowest of tracking lines 48, 50, 52, 54 may provide an indication as to the true location of the work surface on the electronic terrain map. Specifically, OC 28 may determine which tracking line has the lowest elevation based on the data points of tracking lines 48, 50, 52, 54, and update the electronic terrain map, accordingly. The lowest tracking line is sometimes the most accurate of the set of data points and, thus, the accuracy and completeness of terrain map may be improved. As with the tracking rectangles, OC 28 may adjust a size, position, and/or number of tracking lines 48, 50, 52, 54 based on a position, heading, orientation, and/or acceleration of machine 12 and/or work tool 16.

The use of tracking lines 48, 50, 52, 54 may simplify and reduce computation of the electronic terrain map. For example, rather than dividing area under tracks 18 into multiple tracking rectangles, OC 28 may determine locations of only a few points below tracks 18 that provide the most useful information to update the electronic terrain map. Specifically, data associated with the front, middle, and rear points below tracks 18 may provide sufficient data to accurately determine a trajectory of tracks 18.

After receiving data in real time with movements of machines 12 at worksite 10, system 20 may compile the data to generate a comprehensive electronic map. The updated electronic map may then be sent out to each machine 12 for subsequent use in operation. The use of system 20 may facilitate operator controlled machines 12 and/or autonomously controlled machines 12 by enhancing the accuracy and completeness of the electronic terrain map.

INDUSTRIAL APPLICABILITY

The disclosed system 20 may be applicable to any machine and worksite application where accurate terrain mapping is desirable. The disclosed system 20 may track movement of machine 12 and work tool 16 via a plurality of virtual tracking features, and update in real time an electronic terrain map used by machine 12. Specifically, system 20 may utilize multiple tracking rectangles 32, 34, 46 and/or multiple tracking lines 48, 50, 52, 54 associated with machine 12 and work tool 16. The use of a plurality of tracking features may enhance the terrain map accuracy and completeness. As a result, the increased accuracy and completeness of the terrain map may reduce errors in operation of machine 12.

In addition, the disclosed system 20 may selectively adjust the size, position, and/or number of virtual tracking features in mapping the terrain. For example, the size, position, and/or number of tracking rectangles 32, 34, 46 or tracking lines 48, 50, 52, 54 may be adjusted based on the position, traveling speed, and/or orientation of machine 12 and/or work tool 16. Additionally, the disclosed system 20 may utilize operational states of work tool 16 to determine whether or not to use a virtual tracking feature associated with work tool 16 in mapping the terrain. As a result, the disclosed system 20 may create an accurate and complete terrain map in an efficient manner.

It will be apparent to those skilled in the art that various modifications and variations can be made to the disclosed system. Other embodiments will be apparent to those skilled in the art from consideration of the specification and practice of the disclosed system. For example, although described as rectangles in some embodiments, the virtual tracking features could alternatively be circles, triangles, ellipses, or any other shapes. It is intended that the specification and examples be considered as exemplary only, with a true scope being indicated by the following claims and their equivalents.

What is claimed is:

1. A terrain mapping system for a machine having at least one traction device, the system comprising:
    a sensor associated with the machine and configured to generate a signal indicative of a position of the machine;
    at least one controller in communication with the sensor, the at least one controller configured to:
        receive the signal from the sensor;
        divide an area between the at least one traction device and a work surface into a plurality of virtual tracking features based on the signal and known geometry of the machine;
        track movement of the plurality of virtual tracking features;
        update an electronic terrain map of a worksite based on the movement of the plurality of virtual tracking features; and
        selectively adjust at least one of a size or a position of at least one of the plurality of virtual tracking features based on at least one of a traveling speed or an orientation of the machine.

2. The terrain mapping system of claim 1, wherein the plurality of virtual tracking features includes:
    a first rectangle extending between a front end of the at least one traction device and a middle of the at least one traction device; and
    a second rectangle extending between the middle of the at least one traction device to a rear end of the at least one traction device.

3. The terrain mapping system of claim 1, wherein the at least one controller is configured to decrease the size of at least one of the plurality of virtual tracking features when the traveling speed exceeds a threshold speed.

4. The terrain mapping system of claim 1, wherein:
    the machine has a work tool;
    the sensor is a first sensor;
    the system further includes a second sensor associated with the work tool and configured to generate a signal indicative of a position of the work tool; and
    the at least one controller is configured to:
        receive the signal from the second sensor;
        determine a location of an additional tracking feature defining an area between a front end of the at least one traction device and a bottom edge of the work tool based on the signal and known geometry of the machine and the work tool;
        track movement of the additional tracking feature; and
        update the electronic terrain map of the worksite based on the movement of the additional tracking feature.

5. The terrain mapping system of claim 4, wherein the at least one controller is configured to:
    determine when the work tool is engaged with the work surface; and
    only use the additional tracking feature to update the electronic terrain map when the work tool is engaged with the work surface.

6. The terrain mapping system of claim 4, wherein the at least one controller is configured to:
    determine when the work tool is at least partially full of material; and
    only use the additional tracking feature to update the electronic terrain map when the work tool is at least partially full of material.

7. The terrain mapping system of claim 1, wherein the at least one traction device includes two spaced apart traction devices, and the plurality of virtual tracking features includes:
    a front line extending between front ends of the traction devices;
    a middle line extending between centers of the traction devices; and
    a rear line extending between rear ends of the traction devices.

8. The terrain mapping system of claim 7, wherein:
    the machine has a work tool;
    the sensor is a first sensor;
    the system further includes a second sensor associated with the work tool and configured to generate a signal indicative of a position of the work tool; and
    the at least one controller is configured to:
        receive the signal from the second sensor;
        determine a location of a work tool line defining a location of a bottom edge of the work tool based on the signal from the second sensor;
        track movement of the work tool line; and
        update the electronic terrain map of the worksite based on the movement of the work tool line.

9. The terrain mapping system of claim 8, wherein the at least one controller is configured to:
    determine a gravitationally lowest of the front line, middle line, rear line, and the work tool line at a location on the electronic terrain map of the worksite; and
    update the electronic terrain map of the worksite based on only the gravitationally lowest line.

10. The terrain mapping system of claim 1, wherein:
    the at least one traction device includes two tracks on opposite sides of the machine; and
    the plurality of virtual tracking features includes one rectangle associated with each of the two tracks.

11. The terrain mapping system of claim 1, wherein:
the at least one traction device includes two tracks on opposite sides of the machine;
each track has multiple shoes that are pivotally connected to each other end-to-end; and
the plurality of virtual tracking features includes a rectangle associated with locations of each shoe of the tracks.

12. A method for mapping terrain using at least one controller, the method comprising:
sensing a position of a machine as the machine travels along the terrain via at least one traction device;
dividing an area between the at least one traction device and a work surface into a plurality of virtual tracking features based on the sensed position of the machine and known geometry of the machine;
tracking movement of the plurality of virtual tracking features; and
updating an electronic terrain map of a worksite based on the movement of the plurality of virtual tracking features; and
selectively adjusting at least one of a size or a position of at least one of the plurality of virtual tracking features based on at least one of a traveling speed or an orientation of the machine.

13. The method of claim 12, wherein the method further includes:
sensing a position of a work tool associated with the machine;
determining a location of an additional tracking feature defining an area between a front end of the at least one traction device and a bottom edge of the work tool based on the sensed position of the work tool;
tracking movement of the additional tracking feature; and
updating the electronic terrain map of the worksite based on the movement of the additional tracking feature.

14. The method of claim 13, wherein the method further includes:
determining when the work tool is engaged with the work surface; and
only using the additional tracking feature to update the electronic terrain map when the work tool is engaged with the work surface.

15. The system of claim 13, wherein the at least one controller is configured to:
determining when the work tool is at least partially full of material; and
only using the additional tracking feature to update the electronic terrain map when the work tool is at least partially full of material.

16. A terrain mapping system for a machine having at least one traction device and a work tool, the system comprising:
a first sensor associated with the machine and configured to generate a first signal indicative of a position of the machine;
a second sensor associated with the work tool and configured to generate a second signal indicative of a position of the work tool;
at least one controller in communication with the first and second sensors, the at least one controller configured to:
receive the first and second signals;
divide an area between the at least one traction device and a work surface into a first tracking feature and a second tracking feature based on the first signal and known geometry of the machine;
determining a location of a third tracking feature defining an area between a front end of the at least one traction device and a bottom edge of the work tool based on the second signal and known geometry of the machine and the work tool;
track movement of the first, second, and third tracking features; and
update an electronic terrain map of a worksite based on the movement of the first, second, and third tracking features;
selectively adjust at least one of a size or a position of at least one of the first, second, and third tracking features based on at least one of a traveling speed or an orientation of the machine.

\* \* \* \* \*